(12) United States Patent
Bachmann et al.

(10) Patent No.: US 11,820,441 B2
(45) Date of Patent: Nov. 21, 2023

(54) SPRING ELEMENT FOR A REDUCTION GEAR OF AN ELECTROMECHANICAL STEERING SYSTEM

(71) Applicants: thyssenkrupp Presta AG, Eschen (LI); thyssenkrupp AG, Essen (DE)

(72) Inventors: Andreas Bachmann, Langenargen (DE); Felix Burger, Feldkirch (AT); Martin Graf, Triesen (LI); Dirk Möller, Sennwald (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 416 days.

(21) Appl. No.: 17/284,818

(22) PCT Filed: Oct. 16, 2019

(86) PCT No.: PCT/EP2019/078105
§ 371 (c)(1),
(2) Date: Apr. 13, 2021

(87) PCT Pub. No.: WO2020/079090
PCT Pub. Date: Apr. 23, 2020

(65) Prior Publication Data
US 2021/0339795 A1 Nov. 4, 2021

(30) Foreign Application Priority Data
Oct. 18, 2018 (DE) .................... 10 2018 125 887.9

(51) Int. Cl.
*B62D 5/04* (2006.01)
*F16F 1/32* (2006.01)
(Continued)

(52) U.S. Cl.
CPC .......... *B62D 5/0454* (2013.01); *B62D 5/0409* (2013.01); *F16F 1/024* (2013.01); *F16F 1/324* (2013.01); *F16F 2234/06* (2013.01)

(58) Field of Classification Search
CPC ..... B62D 5/0454; B62D 5/0409; F16F 1/024; F16F 1/324; F16F 2234/06
(Continued)

(56) References Cited

U.S. PATENT DOCUMENTS 4,739,855 A * 4/1988 Miyoshi ................. B62D 5/008
180/422
4,967,858 A * 11/1990 Kotake .................... B62D 6/10
439/15
(Continued)

FOREIGN PATENT DOCUMENTS

| AT | 512609 A1 | 9/2013 |
|---|---|---|
| CN | 106536327 A | 3/2017 |

(Continued)

OTHER PUBLICATIONS

English Translation of International Search Report issued in PCT/EP2019/078105, dated Dec. 10, 2019.

*Primary Examiner* — Ha Dinh Ho
(74) *Attorney, Agent, or Firm* — thyssenkrupp North America, LLC

(57) ABSTRACT

An electromechanical steering system may include a reduction gearbox where a worm gear is mounted in first and second bearings rotatably about a longitudinal axis. Rolling elements are disposed between inner and outer rings of the bearings. The inner rings are rotationally fixed on a shaft driven by the worm gear. A spring element is disposed between the inner ring of the second bearing and the worm gear. The spring element has an at least partially annular main body that when installed extends coaxially with the longitudinal axis. Spring arms in a circumferential direction (Continued)

are spaced apart from the longitudinal axis emanating from an external circumferential side of the main body. A first spring arm has a first leg that points away from the longitudinal axis on which a free end is disposed, with the second leg running at least partially parallel to the longitudinal axis.

19 Claims, 5 Drawing Sheets

(51) Int. Cl.
 *F16F 1/00* (2006.01)
 *F16F 1/02* (2006.01)

(58) Field of Classification Search
 USPC .......................................................... 74/640
 See application file for complete search history.

(56) References Cited

U.S. PATENT DOCUMENTS

| | | |
|---|---|---|
| 5,709,516 A | 1/1998 | Peterson et al. |
| 9,777,826 B2 * | 10/2017 | Anma .................. B62D 5/0409 |
| 10,661,822 B2 * | 5/2020 | Kawamura ............. F16C 27/06 |
| 2005/0235768 A1 | 10/2005 | Shimizu |
| 2013/0075189 A1 * | 3/2013 | Sekikawa ............... F16C 23/08 |
| | | 180/444 |
| 2015/0292584 A1 | 10/2015 | Rode et al. |
| 2015/0375767 A1 | 12/2015 | Agbor |
| 2016/0319906 A1 * | 11/2016 | Kawamura .......... B62D 5/0454 |
| 2017/0217476 A1 | 8/2017 | Schlegel et al. |
| 2019/0308654 A1 | 10/2019 | Schmidt |

FOREIGN PATENT DOCUMENTS

| | | |
|---|---|---|
| DE | 198 11 784 A | 9/1999 |
| DE | 199 60 277 A | 7/2000 |
| DE | 60 2005 002 071 T | 5/2008 |
| DE | 10 2010 002 569 A | 9/2010 |
| DE | 102013213708 A1 | 1/2015 |
| EP | 1 645 761 A | 4/2006 |
| JP | 2001-280428 A | 10/2001 |
| JP | 2008296633 A | 12/2008 |
| JP | 2015031388 A | 2/2015 |
| JP | 2015124774 A | 7/2015 |

* cited by examiner

SPRING ELEMENT FOR A REDUCTION GEAR OF AN ELECTROMECHANICAL STEERING SYSTEM

CROSS REFERENCE TO RELATED APPLICATIONS

This application is a U.S. National Stage Entry of International Patent Application Serial Number PCT/EP2019/078105, filed Oct. 16, 2019, which claims priority to German Patent Application No. DE 10 2018 125 887.9, filed Oct. 18, 2018, the entire contents of both of which are incorporated herein by reference.

FIELD

The present disclosure generally relates to electromechanical steering systems, including springs for reduction gears in such systems.

BACKGROUND

In electromechanical steering systems, a torque which is transmitted to a gearbox and from there is superimposed on the steering torque provided by the driver is generated by way of an electric motor.

An electromechanical power-assisted steering system of the generic type has an electric servomotor which drives a worm shaft which meshes with a worm gear that is disposed on a steering shaft, wherein the worm gear is operatively connected to an input shaft of a steering gearbox and wherein the worm shaft and the steering shaft are rotatably mounted in a common gearbox housing. The worm shaft is connected to the motor shaft of the electric servomotor by way of a clutch.

The bearing of the worm gear in the axial and radial direction is supported and preloaded by means of a preloading element in the form of a spring, such as is known from publication JP 2001-280428 A, for example. However, no constant preload can be implemented herewith, and noise is generated on account of friction. Corrugated springs known for this use furthermore have the disadvantage that a flat (symmetrical) distribution of load is not possible. A tilting moment arises on account of the end and the beginning of the turn. In the installed situation, there is the risk of damage to the bearing end plate, and there is only a minor distance in the radial direction in order for a large spring travel to be implemented.

Thus, a need exists for an electromechanical steering system having a reduction gearbox which operates with particularly little noise and has a preloading element of a bearing that provides improved preloading and a better distribution of load.

DETAILED DESCRIPTION

Figure 1:
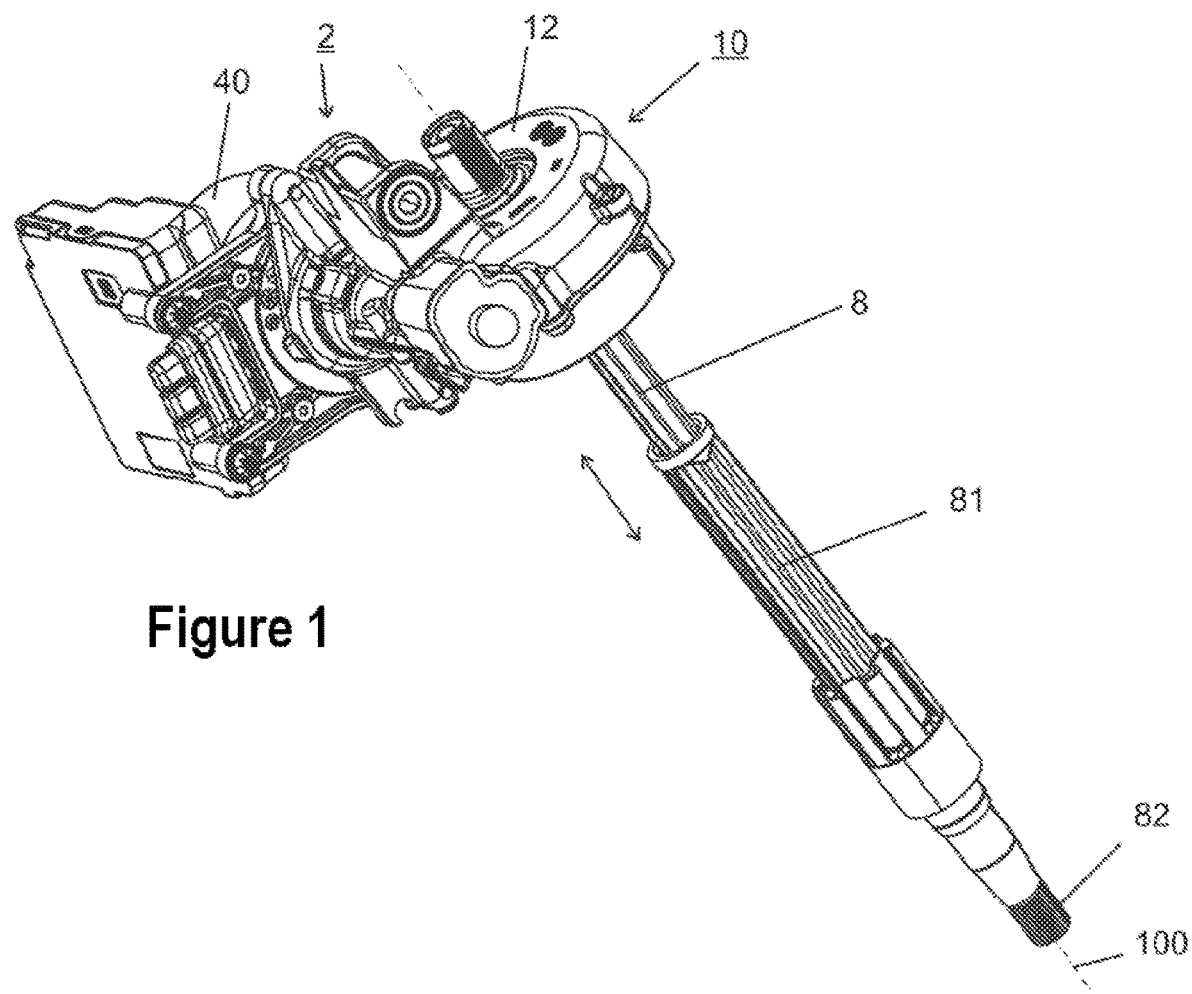
FIG. 1 is an isometric view of an example worm gearbox in an electromechanical power-assisted steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly provided is an electromechanical steering system for a motor vehicle, having a reduction gearbox comprising a worm and a worm gear, wherein the worm gear in a gearbox housing is mounted in a first bearing at a first end side and in a second bearing at a second end side so as to be rotatable about a longitudinal axis, wherein both bearings have an outer ring and an inner ring between which rolling elements are disposed, wherein the inner rings are disposed so as to be rotationally fixed on a shaft that is driven by the worm gear, and the outer rings sit in the gearbox housing, and wherein, when viewed in the direction of the longitudinal axis, a spring element is disposed between the inner ring of the second bearing and the worm gear. The spring element has an at least partially annular main body which in the installed state extends coaxially with the longitudinal axis, spring arms which in the circumferential direction are spaced apart from the longitudinal axis emanating from the external circumferential side of said main body, wherein at least one spring arm has a free end, wherein the spring arm comprises a first leg which points away from the longitudinal axis, and comprises a second leg which runs so as to be at least partially parallel to the longitudinal axis and on which the free end is configured. It is enabled on account thereof that a contact face in which force is distributed and tension is thus low can be provided in the longitudinal direction. The spring element by way of the spring arms can generate a uniform preload without tilting, on account of which noise can be reduced. One end of the second leg along the longitudinal axis preferably has an axial position which is different from that of a second end, wherein the second end is preferably further spaced apart from the main body than the first end. The second leg preferably runs so as to be parallel, or approximately parallel, to the longitudinal axis. It may be provided that only a central portion of the second leg runs so as to be parallel to the longitudinal axis. The second leg can be planar or radiused or define an angle. The first leg and the second leg define an angle which is smaller than 180°.

The bearing is preferably configured as a rolling bearing, furthermore preferably as a ball bearing or as a roller bearing. The reduction gearbox is configured as a helical gearbox and particular preferably as a worm gearbox.

The at least one spring arm preferably has a third leg which points toward the longitudinal axis and forms the free end. The spring arm herein can preferably be configured so as to be U-shaped or V-shaped, cup-shaped or bowl-shaped. It is furthermore conceivable and possible for the spring arms to be configured so as to be W-shaped.

The main body in the installed state preferably lies against an end side of the second inner ring that is proximal to the worm gear. The rolling bearing can thus be protected against damage by the spring arms. It is preferable for the spring arms in the installed state to lie against the end side of the worm gear that faces the second bearing, in particular against a clearance of the worm gear that is disposed in the end side that faces the second bearing such that the worm gear is preloaded in the longitudinal direction and the radial direction.

The spring element is preferably designed such that the free ends of the spring arms on a common side of the spring element extend in the direction of the longitudinal axis.

In one preferred embodiment, the main body of the spring element is annular. Slots which are mutually spaced apart in the circumferential direction of the main body can be disposed on the outer and/or inner face on the annular region of the main body. Improved preloading of the spring element can be enabled on account thereof. The main body can be configured so as to be flat or undulated in order for the spring travel to be increased. The spring element by means of a metal spinning method or a press/bending method can be configured as a sheet-metal element and be covered with plastics material. The use of a lubricant varnish is also conceivable and possible. The spring element is particularly preferably configured so as to be integral; it is however conceivable and possible for said spring element to be configured in multiple parts.

It can be provided that the free ends of the spring arms lie against the worm gear; it is preferable herein for the free ends of the spring arms to have a plastics material coating and thus to be protected against wear.

It can however also be provided that the spring arms have contact faces which are situated on the external side and which are in each case formed by end regions of the spring arms that are bent further inward toward the main body, wherein these contact faces lie against the worm gear.

In order for the distribution of load to be uniformly distributed, the spring arms are at least in part uniformly spaced apart in the circumferential direction, in particular across the entire circumference. The spring arms herein are preferably disposed so as to be symmetrical in relation to a plane which is defined by the longitudinal axis, or disposed in the circumferential direction about the longitudinal axis so as to be offset by a defined angle about the center of the spring.

It can be provided that cams which are oriented in the longitudinal direction and center the spring element on the shaft, enable a contact face in the longitudinal direction and are provided as an anti-rotation safeguard are disposed on the internal circumferential side of the main body.

In one preferred embodiment, the spring element is configured so as to be integral and is in particular made from a sheet-metal part. The production can take place by means of a metal-spinning methods or a press/bending method.

The spring arms, when viewed in the longitudinal section along the longitudinal axis, preferably have an approximately U-shaped profile. It is furthermore conceivable and possible for the free ends of the spring arms to be closed on the main body, or for each spring arm to be configured or bent, respectively, in a tubular manner, respectively. Particularly preferably, the spring arms, when viewed in the longitudinal section, are configured so as to be asymmetrical. It is enabled on account thereof that no forces act in the radial direction and the stiffness of the main body can furthermore be compensated for. It is furthermore preferable for the spring arms to be bent in such a manner that said spring arms extend so as to be parallel to the longitudinal axis so as to enable a contact face in which force is distributed and tension is thus low in the longitudinal direction. In one advantageous embodiment, the spring arms have a first leg which extends from the main body and in relation to the plane of the main body encloses an angle in a range from 10° to 30°. The main body in the longitudinal direction preferably has a thickness in a range from 0.3 mm to 1 mm. The entire spring element having the spring arms preferably has an external thickness in a range from 6.5 mm to 11 mm. The spring arms in the circumferential direction preferably have a maximum width in a range between 5 mm and 12 mm. it can be provided that the spring arms in terms of the width thereof are designed so as to taper toward the longitudinal axis so that tensions during compression are uniformly distributed.

The second leg preferably has an internal circumferential face and an external circumferential face, wherein the external circumferential face is disposed so as to be further apart from the longitudinal axis than the internal circumferential face and on the external circumferential face is touched by a tangent which is parallel to the longitudinal axis. A secant which is parallel to this tangent is formed by the internal circumferential face of the second leg, wherein the internal circumferential face is disposed so as to be closer to the longitudinal axis than the external circumferential face. The secant and the tangent run so as to be parallel to the longitudinal axis and are spaced apart by a spacing, where $Dx \leq 10 \cdot d1 \geq d1$, preferably $Dx \leq 7 \cdot d1 \geq 5 \cdot d1$, where $d1$ corresponds to the thickness of the main body. It is furthermore preferable that one tangent that diverges from the longitudinal axis is in each case formed by the first leg and by the third leg. The second, bent, leg lies between these two tangents. A right angle is formed at the point where these two tangents intersect. In terms of the right angle, the two tangents form the adjacent sides to the angle. The opposite side to the angle is formed by the tangent or by the secant such that two isosceles right-angled triangles are defined.

In one embodiment, the main body is configured so as to be planar. Said main body may however also be inclined, or have a bent, parabolic or undulated shape, respectively, and thus contribute toward the spring travel. The spring arms preferably project from the annular main body outward in the radial direction to the longitudinal axis, wherein the spring arms are bent or canted back inward toward the main body such that said spring arms by way of the free ends thereof face one another toward the center.

It is also conceivable that the annular main body does not have a mechanical closed connecting ring. In this case, the spring arms and potential bending cams emanate from a linear main body. The main body is bent so as to form a ring during production. The spring arms in a manner similar to beams-in-bending are bent from the sheet-metal part so as to form U-shaped spring elements, V-shaped spring elements with an acute or obtuse angle, or cup-shaped or bowl-shaped spring elements, said spring elements being connected to one another by way of the main body.

It can also be provided that the main body has spring arms on both sides, wherein the spring arms in this instance lie against the inner ring of the second rolling bearing as well as against the worm gear.

Figure 2:
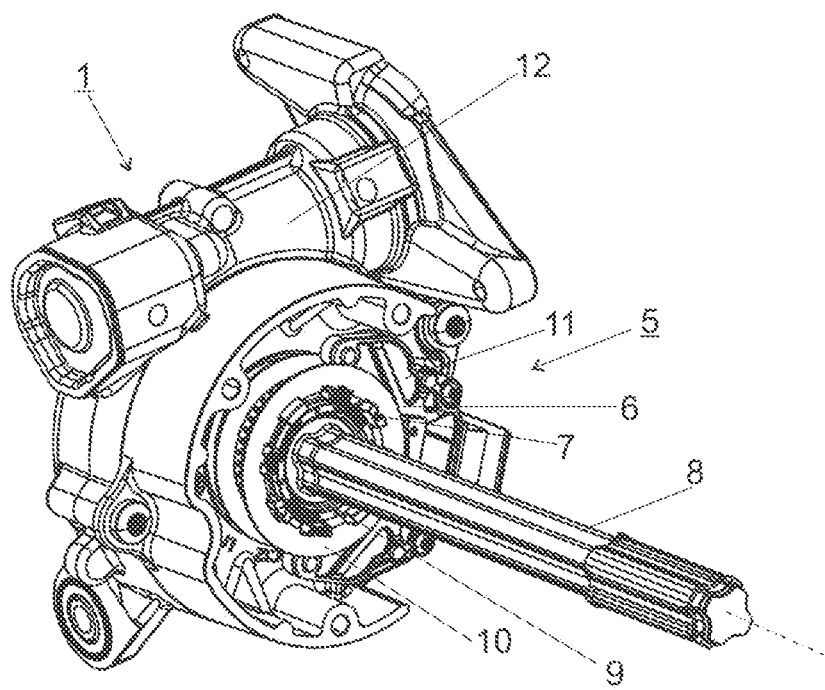
FIG. 2 is another isometric view of the worm gearbox of the power-assisted steering system according to FIG. 1.
Figure 3:
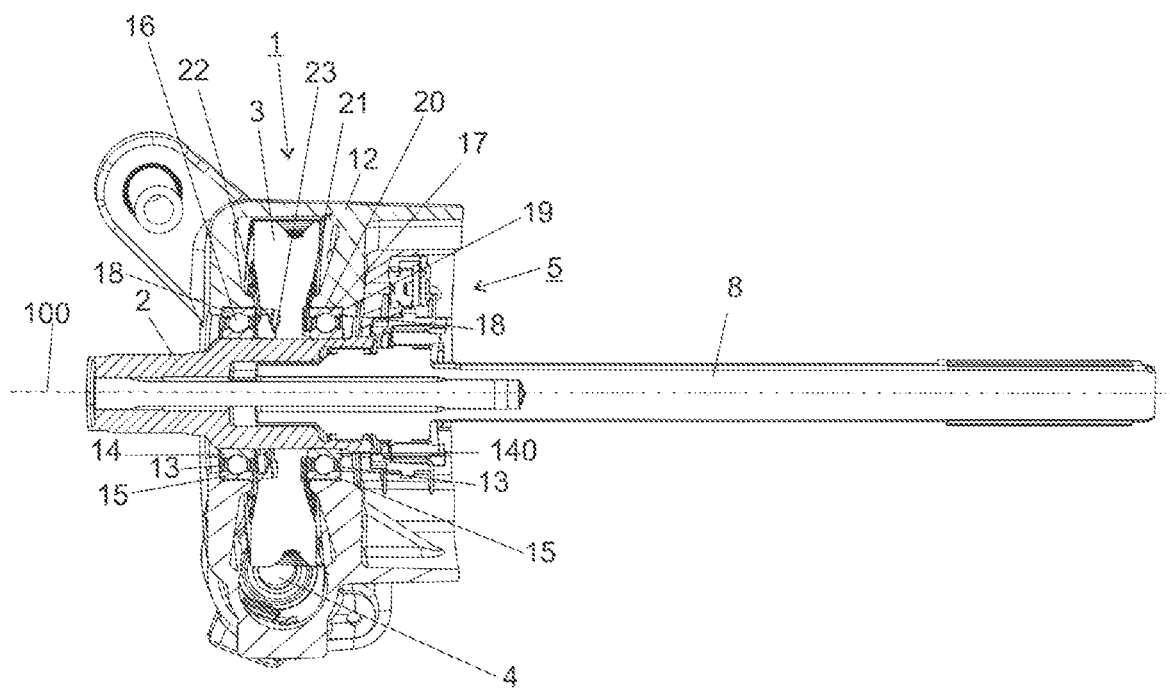
FIG. 3 is a longitudinal section view through a worm gearbox.

FIGS. 1 to 3 show a worm gearbox 1 as part of an electromechanical power-assisted steering system which transmits an auxiliary torque from an electric motor 42 to a lower steering shaft 2. A worm gear 3 which is connected in a rotationally fixed manner to the lower steering shaft 2 is provided. A rotation of the worm gear 3 about the rotation axis 100 thereof causes an auxiliary force, or an additional force, respectively, to be applied to the steering shaft 2 so as to accordingly incorporate an auxiliary force, or an additional steering angle, respectively, into the steering train.

The worm gear 3 is driven by way of a worm 4 which in turn is driven by the electric motor 40, wherein the output of the electric motor for transmitting torque is correspondingly coupled to the worm 4. An integral functional unit 5 having a torque sensor unit 6 and a steering angle sensor unit 7 is furthermore provided in FIG. 2. The torque sensor unit 6 detects the rotation of an upper steering shaft 8 in relation to the lower steering shaft 2 as a measure of the torque manually exerted on the upper steering shaft 8. In contrast, the steering angle sensor unit 7 measures the current steering angle of the lower steering shaft 2. The torque sensor unit 6 has an annular magnet 9 (permanent magnet) which is connected in a rotationally fixed manner to the upper steering shaft 8, and a magnetic flux conductor 10. An associated sensor unit 11 is held so as to be stationary in space. The upper steering shaft 8 in a rear steering shaft part 81 is rotationally fixed yet adjustable in the direction of the longitudinal axis 100, as is indicated by the double arrow in FIG. 1, so as to adjust in the longitudinal direction a steering wheel which is not illustrated here and is attached to a fastening portion 82.

As is illustrated in FIG. 3, the worm gear 3 at both end sides thereof is mounted in a gearbox housing 12 so as to be rotatable by means of a ball bearing 13. The ball bearings 13 have an inner ring 14, 140 which is connected to the lower steering shaft 2, and an outer ring 15 which sits in the gearbox housing 12, and rolling elements 16. The rolling elements 16 run in grooves between the inner ring 14, 140 and the outer ring 15. The inner rings 14, 140 have an inner cylindrical shell face for a tight fit on the lower steering shaft 2. The outer rings 15 are in each case received in a seat 17 in the gearbox housing 12. The seat 17 is in each case formed by an annular shoulder 18 which in the gearbox housing 12 encircles the longitudinal axis 100 in the circumferential direction. The shoulders 18 serve as a contact face which extends in the radial direction to the longitudinal direction 100 and thus defines the orientation of the ball bearing 13 in the longitudinal direction 100. The outer rings 15 by way of the end sides 19 thereof that are proximal to the worm gear and by way of the shell face 20 thereof thus lie against the gearbox housing 12. The outer rings 15 are not in contact with the worm gear 3. In contrast, the inner rings 14, 140 by way of the end sides 21 thereof that are proximal to the worm gear are supported on the worm gear 3. A first inner ring 140 of a first bearing, by way of the end side 21 of the former that is proximal to the worm gear, directly lies against a first end side of the worm gear 3. In contrast, a spring element 22 which applies a constant preload on the encircling/annular face of the second inner ring 14 is provided between a second inner ring 14 of a second bearing and a second end side of the worm gear. The spring element 22 lies against the end side of the second inner ring 14 that is proximal to the worm gear and engages in a clearance 23 in the second end side of the worm gear 3 that encircles the longitudinal axis 100 in the circumferential direction.

Figure 4:
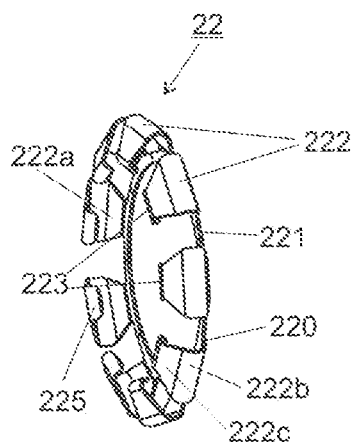
FIG. 4 is a perspective view of an example spring element.
Figure 4A:
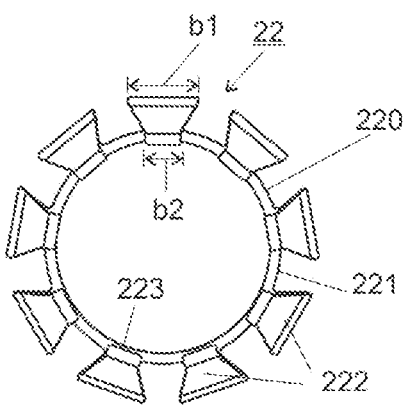
FIG. 4A is a front view of the spring element of FIG. 4.
Figure 4B:
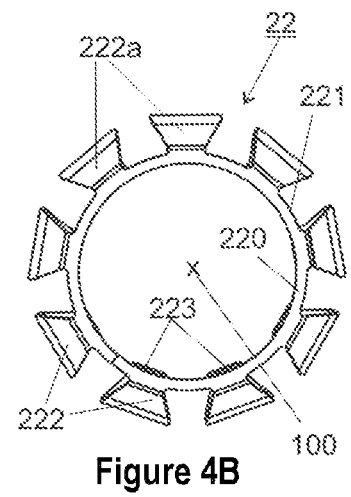
FIG. 4B is a back view of the spring element of FIG. 4.
Figure 4C:
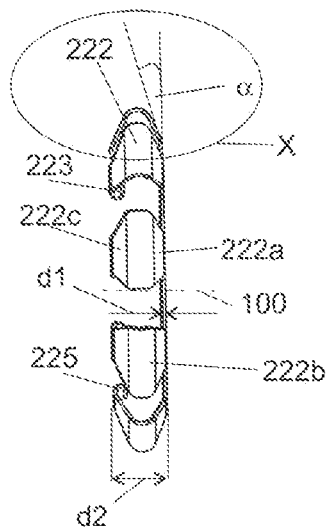
FIG. 4C: is a side view of the spring element of FIG. 4.

A first example of a spring element 22 is illustrated in FIGS. 4 to 4C. The spring element 22 is formed by an annular main body 220, spring arms 222 emanating at a uniform spacing from the external circumferential side 221 of said main body 220. The spring arms 222 have in each case a free end 223. Proceeding from the main body 220, a first leg 222a of the spring arm 222 points outward, away from the longitudinal axis 100. The first leg 222a transitions to a second leg 222b which in this embodiment assumes a bent shape. The second leg at the highest point thereof or in the center thereof is approximately parallel to the longitudinal axis 100. The second leg transitions to a third leg 222c of the spring arm 222, said third leg 222c pointing toward the longitudinal axis 100. Proceeding from the main body 220, the spring arms 222 widen in the circumferential direction to the longitudinal axis up to a maximum width b1, and in an end region toward the free end 223 then taper down to a minimum width b2. The main body 220 in the installed state lies against the inner ring, and the free ends of the spring arms 223 are supported on the worm gear in the clearance.

This spring arms 222 project from the annular main body 220 outward in the radial direction to the longitudinal axis 100, wherein the spring arms 222 are bent or canted back inward toward the center of the main body such that said spring arms 222 by way of the free ends 223 thereof face one another toward the center. The spring arms 222, when viewed in the longitudinal section along the longitudinal axis, thus have an approximately U-shaped profile. The first leg 222a of the spring arms 222, that extends from the main body 220 and is substantially planar, in relation to the plane of the main body encloses an angle α. The region having the maximum width b1 in terms of the radial direction lies so as to be at the extreme outside and in the second leg 222b. The free ends 223 of the spring arms 222 emanate from the third leg 222c and, when viewed from the center in the direction of the main body or in the direction of the longitudinal axis 100, respectively, are bent inward in such a manner that in the end region a contact face 225 having the minimum width b2 by way of which the spring arms can be supported on the worm gear is configured on the upper side of the spring arms 222. The seat of the spring can be readily controlled as the contact face 225 is relatively large. The spring arms 222 are preferably pulled inward so far that a radial movement/preload is possible. The annular main body 220 in the longitudinal direction has a thickness d1. The entire spring element having the spring arms has an external thickness d2 which in this exemplary embodiment comprises the first, second and third legs 222a-c. The maximum width b1 of the spring arms preferably assumes a value between 5 mm and 12 mm. the external thickness d2 preferably assumes a value between 6.5 and 11 mm. The angle α preferably assumes a value between 10° and 30°. The sheet-metal thickness d1 preferably assumes a value between 0.3 and 1 mm. The spring arms 222 are mutually spaced apart and are connected to one another exclusively by way of the main body. The spring arms are preferably linked to the main body in an integral manner.

Figure 4D:
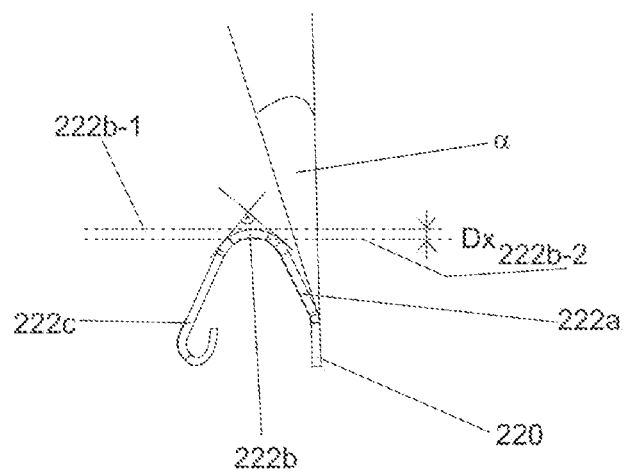
FIG. 4D is a detail view of a fragment X from FIG. 4C.

FIG. 4d represents a partial view from FIG. 4C. It is illustrated herein that the second leg 222b runs so as to be almost parallel to the longitudinal axis. The second leg has an internal circumferential face and an external circumferential face, wherein the external circumferential face is disposed so as to be further apart from the longitudinal axis than the internal circumferential face and on the external circumferential face is touched by a tangent 222b-1 which is parallel to the longitudinal axis. A secant 222b-2 which is parallel to this tangent 222b-1 is formed by the internal circumferential face of the second leg 222b, wherein the internal circumferential face is disposed so as to be closer to the longitudinal axis 100 than the external circumferential face. The secant 222b-2 and the tangent 222b-1 run so as to be parallel to the longitudinal axis 100 and are mutually spaced apart by a spacing Dx, where Dx≤10·d1≥d1, preferably Dx≤7·d1≥5·d1. It is furthermore illustrated that one tangent that diverges from the longitudinal axis is in each case formed by the first leg 222a and by the third leg 222c. The second, bent, leg 222b lies between these two tangents. A right angle is formed at the point where these two tangents intersect. In terms of the right angle, the two tangents form the adjacent sides to the angle. The opposite side to the angle is formed by the tangent 222b-1 or by the secant 222b-2 such that two isosceles right-angled triangles are defined.

Figure 5:
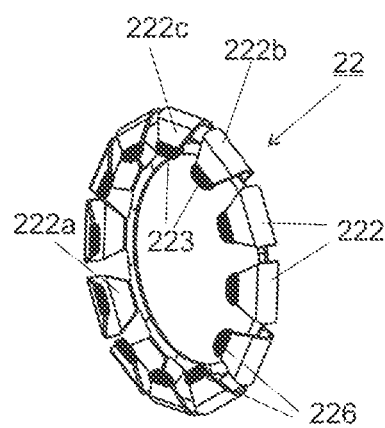
FIG. 5 is a perspective view of another example spring element.
Figure 5A:
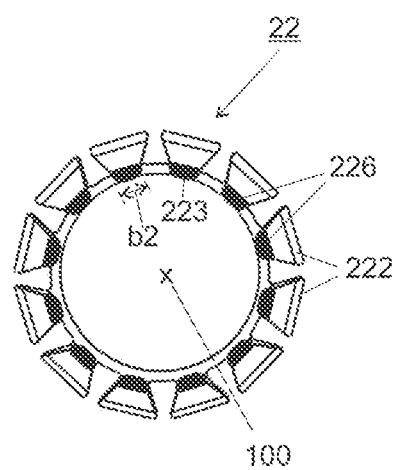
FIG. 5A is a front view of the spring element of FIG. 5.
Figure 5B:
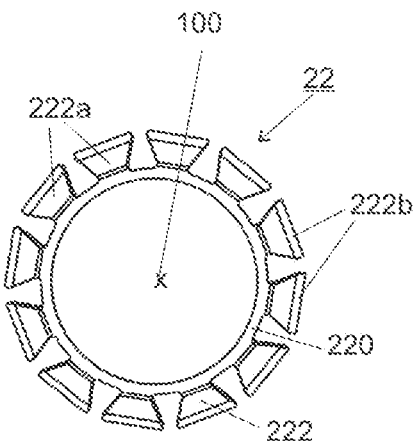
FIG. 5B is a back view of the spring element of FIG. 5.
Figure 5C:
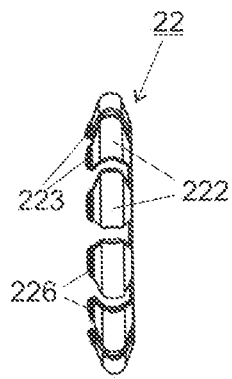
FIG. 5C: is a side view of the spring element of FIG. 5.

FIGS. 5 to 5C show a further exemplary embodiment of a spring element 22 which corresponds substantially to the previously described spring element but in which the free ends 223 of the spring arms 222 are not additionally bent inward. The end faces of the free ends 223 in the installed state thus lie against the worm gear 3. The free ends 223 of the spring arms 222 taper sharply down to the minimum width b2, on account of which stresses during compression can be uniformly distributed. The free ends 223 have a plastics material covering 226 in order to prevent wear on the spring arms 222.

Figure 6:
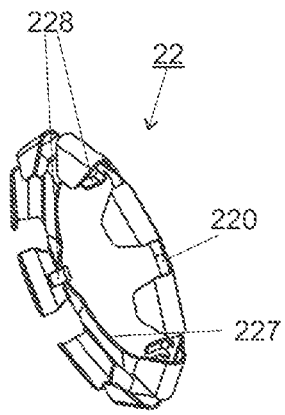
FIG. 6 is a perspective view of yet another example spring element.
Figure 6A:
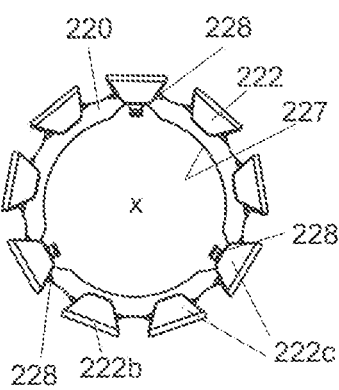
FIG. 6A is a front view of the spring element of FIG. 6.
Figure 6B:
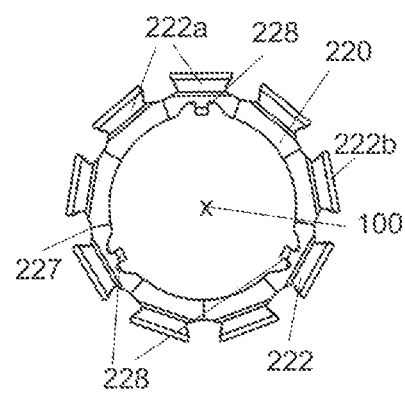
FIG. 6B is a back view of the spring element of FIG. 6.

In contrast, the plastics material covering is dispensed with in the exemplary embodiment of FIGS. 6 to 6B. Here, bending cams 228 which are oriented in the longitudinal direction and serve for centering the spring element 22 on the outer steering shaft as well as an anti-rotation safeguard are provided on an internal circumferential side 227 of the annular main body 220.

Figure 7:
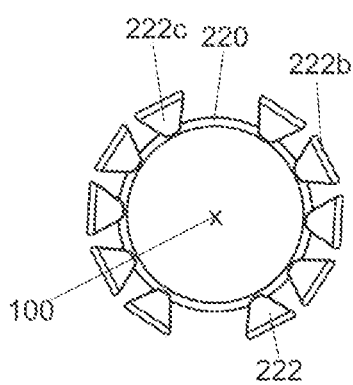
FIG. 7 is a plan view of another example spring element.
Figure 8:
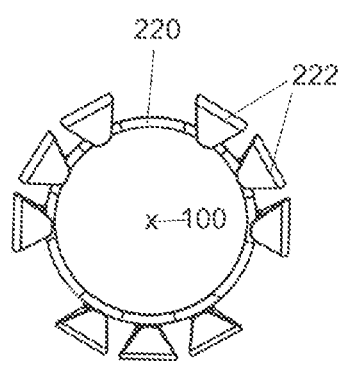
FIG. 8 is a plan view of still another example spring element.

It is also conceivable for the spring arms 222 of the spring element 22 to be only in part disposed at regular spacings in the circumferential direction of the main body 220, as is illustrated in FIGS. 7 and 8. The disposal herein can, for example, take place so as to be symmetrical to a plane which is defined by the longitudinal axis 100, as is illustrated in FIG. 7, or in the circumferential direction about the longitudinal axis 100 so as to be offset by a defined angle about the center of the spring, as is illustrated in FIG. 8.

Figure 9:
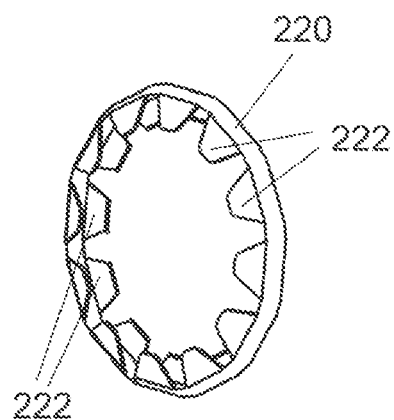
FIG. 9 is a rear view of yet another example spring element.

It can also be provided that the main body 220 is inclined, or has a bent shape, respectively, so as to likewise contribute toward the spring travel. Such a main body 220 is illustrated in FIG. 9. In the exemplary embodiment shown, substantially triangular, planar spring arms 222 extend from both sides of the main body 220 in the direction of the longitudinal axis 100. In this exemplary embodiment, the spring arms of the one side lie against the worm gear, and the spring arms of the other side lie against the inner ring of the bearing.

Figure 10:
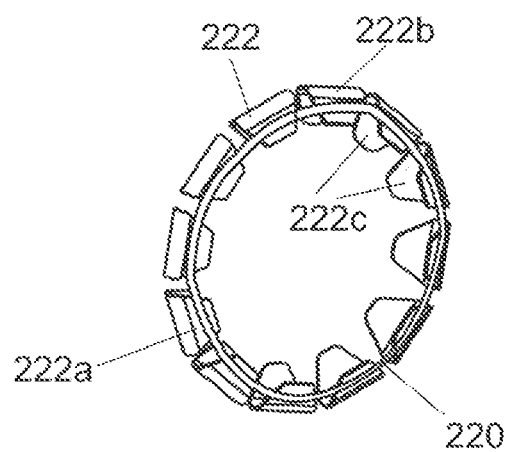
FIG. 10 is a rear view of a further example spring element.

FIG. 10 shows a further exemplary embodiment in which the annular main body 220 is designed so as to be almost wire-shaped and spring arms 222 which in the profile are U-shaped at one of the legs 222a-c thereof, in this example the first leg 222a, on the external side are connected to the main body 220. The main body 220 herein lies in the central region of the first leg 222a, between the free end of the latter and between the second leg 222b. The spring arm 222 herein protrudes beyond the main body 220 in the direction of the longitudinal axis 100. As in the other embodiments, the spring arms 222 extend in the direction of the center of the spring.

Figure 11:
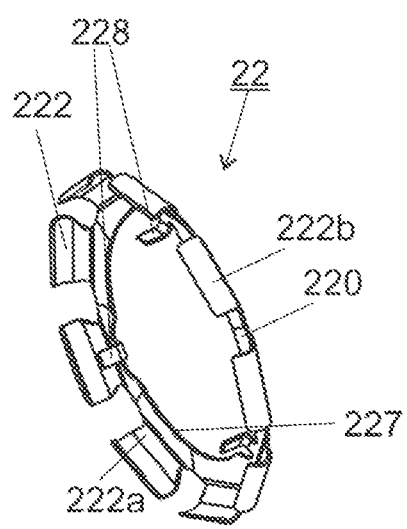
FIG. 11 is an isometric view of an example spring element.
Figure 11A:
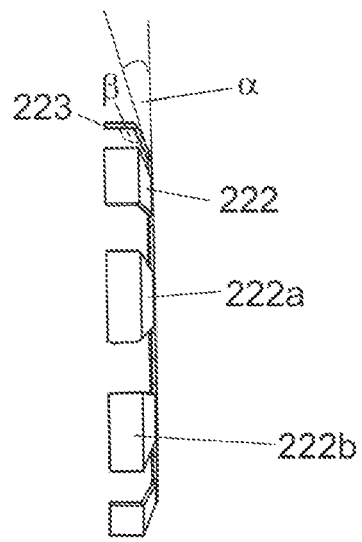
FIG. 11A is a lateral view of an example spring element.

It is furthermore preferable that the spring element 22 is composed of only the first leg 222a and the second leg 222b, as is illustrated in FIGS. 11 and 11a, so as to enable a contact face in which force is distributed and tension is thus low in the longitudinal direction. The first leg 222a herein runs away from the main body 220 and extends so as to be substantially planar and in relation to the plane of the main body 220 encloses an angle α. The second leg 222b emanates from the first leg 222a and forms the free and 223. The second leg herein is planar, as is illustrated in FIG. 11a, and is thus configured so as to be parallel to the longitudinal axis. The first leg 222a and the second leg 222b herein define an angle β which is smaller than or equal to 180° and is larger than α. The first leg 222a and the second leg 222b preferably assume a V-shape, as is illustrated in FIG. 11a. The second leg 222b may also assume a bent shape, as is illustrated in FIG. 11. The second leg herein forms a U-shape and is bent in such a manner that the second leg 222b is approximately parallel to the longitudinal axis. The spring element is preferably configured so as to be integral, this simplifying the assembling and preventing friction between the components of the part and an associated generation of noise. The spring element can however also be configured in multiple parts. The spring element moreover has a symmetrical distribution of load (even when the load may not be constant across the circumference). The production can take place by way of a bending process of a single sheet-metal part. In comparison to disk springs, less tension in the tangential direction can be implemented in the basic concept of a beam-in-bending. Any movement in the radial direction of the spring on the seat of the spring is suppressed, this leading to a positive NVH behavior.

It is also conceivable for the annular main body not to have a mechanically closed connecting ring. In this case, the spring arms and potential bending cams emanate from a linear main body. The main body is bent so as to form a ring during production. The spring arms in a manner similar to beams-in-bending are bent from the sheet-metal part so as to form U-shaped spring elements which are connected to one another by way of the main body.

The main body can be configured so as to be flat or undulated in order for the spring travel to be increased. The spring element by means of a metal spinning method or a press/bending method can be configured as a sheet-metal element and be covered with plastics material. The use of a lubricant varnish is also conceivable and possible. The spring element is particularly preferably configured so as to be integral; it is however conceivable and possible for said spring element to be configured in multiple parts.

It is furthermore conceivable and possible for the free ends of the spring arms to be closed so as to thus guarantee simplified assembling, since no bulk material can be trapped on account thereof, for example.

Play in the axial direction, tolerances and thermal expansions can be compensated for on account of the spring according to the invention.

What is claimed is:

1. An electromechanical steering system for a motor vehicle, the electromechanical steering system comprising:
a reduction gearbox comprising a worm and a worm gear, wherein the worm gear in a gearbox housing is mounted in a first bearing at a first end side and in a second bearing at a second end side so as to be rotatable about a longitudinal axis, wherein the first and second bearings include an outer ring and an inner ring between which rolling elements are disposed, wherein the inner rings are rotationally fixed on a shaft that is driven by the worm gear, wherein the outer rings sit in the gearbox housing; and
a spring element, wherein when viewed in a direction of the longitudinal axis the spring element is disposed between the inner ring of the second bearing and the worm gear, wherein the spring element has an at least partially annular main body that in an installed state extends coaxially with the longitudinal axis, wherein the spring element includes spring arms that in a circumferential direction are spaced apart from the longitudinal axis emanating from an external circumferential side of the at least partially annular main body, wherein a first spring arm of the spring arms has a free end, with a first leg of the first spring arm pointing away from the longitudinal axis, with a second leg of the first spring arm running at least partially parallel to the longitudinal axis, wherein the free end is configured on the second leg.

2. The electromechanical steering system of claim 1 wherein the at least partially annular main body in the installed state lies against an end side of the inner ring of the second bearing that is proximal to the worm gear.

3. The electromechanical steering system of claim 1 wherein the spring arms in the installed state lie against the end side of the worm gear that faces the second bearing.

4. The electromechanical steering system of claim 1 wherein the at least partially annular main body is entirely annular.

5. The electromechanical steering system of claim 1 wherein the spring arms lie against a clearance of the worm gear that is disposed in the end side that faces the second bearing, preloading the worm gear in the longitudinal direction and a radial direction.

6. The electromechanical steering system of claim 1 wherein the first spring arm includes a third leg that points toward the longitudinal axis and forms another free end.

7. The electromechanical steering system of claim 6 wherein the free ends of the spring arms on a common side of the spring element extend in the direction of the longitudinal axis.

8. The electromechanical steering system of claim 6 wherein the free ends of the spring arms lie against the worm gear.

9. The electromechanical steering system of claim 6 wherein the free ends of the spring arms have a plastics material coating.

10. The electromechanical steering system of claim 1 wherein the spring arms are uniformly spaced apart in a circumferential direction.

11. The electromechanical steering system of claim 1 comprising cams that are oriented in a longitudinal direction and that center the spring element on the shaft, wherein the cams are disposed on an internal circumferential side of the at least partially annular main body.

12. The electromechanical steering system of claim 1 wherein the spring element is integral and comprised of sheet metal.

13. The electromechanical steering system of claim 1 wherein the spring arms have a U-shaped profile when viewed in a longitudinal section along the longitudinal axis.

14. The electromechanical steering system of claim 1 wherein the first leg of the first spring arm extends from the at least partially annular main body and is substantially planar, wherein the first leg encloses an angle in a range from 10° to 30° relative to a plane of the at least partially annular main body.

15. The electromechanical steering system of claim 1 wherein in a longitudinal direction the at least partially annular main body has a thickness in a range from 0.3 mm to 1.0 mm.

16. The electromechanical steering system of claim 1 wherein the spring element with the spring arms has an external thickness in a range from 6.5 mm to 11 mm.

17. The electromechanical steering system of claim 1 wherein the spring arms in a circumferential direction have a maximum width in a range between 5 mm and 12 mm.

18. The electromechanical steering system of claim 1 wherein in terms of width the spring arms taper towards the longitudinal axis.

19. The electromechanical steering system of claim 1 wherein the at least partially annular main body is planar.

* * * * *